(12) United States Patent
Liang et al.

(10) Patent No.: US 8,531,785 B2
(45) Date of Patent: Sep. 10, 2013

(54) PRIME LENS FOR A PROJECTOR

(75) Inventors: Yuan-Fan Liang, Taichung (TW);
Tsan-Haw Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 104 days.

(21) Appl. No.: 13/107,748

(22) Filed: May 13, 2011

(65) Prior Publication Data

US 2012/0170132 A1 Jul. 5, 2012

(30) Foreign Application Priority Data

Dec. 30, 2010 (TW) ............................... 99146945 A

(51) Int. Cl.
*G02B 13/04* (2006.01)

(52) U.S. Cl.
USPC ........................................ 359/751; 359/749

(58) Field of Classification Search
USPC ................. 348/335, 340; 359/680, 682, 689,
359/749, 750, 751
See application file for complete search history.

(56) References Cited

U.S. PATENT DOCUMENTS

| 3,583,791 A * | 6/1971 | Mori ............................. 359/751 |
| 2011/0026132 A1* | 2/2011 | Sado ............................. 359/682 |
| 2011/0267704 A1* | 11/2011 | Sado ............................. 359/680 |

\* cited by examiner

*Primary Examiner* — David N Spector
(74) *Attorney, Agent, or Firm* — Tracy M. Heims; Apex Juris, pllc

(57) ABSTRACT

The present invention provides a projection prime lens including first lens group, a second lens group, and a third lens group arranged in sequence along an optical axis from a screen side to a light modulator side. The first lens group has negative refractive power and includes a first lens with negative refractive power and a second lens with negative refractive power. The second lens group has positive refractive power and includes a third lens with positive refractive power and a fourth lens with positive refractive power The third lens group has positive refractive power and includes a fifth lens with negative refractive power, a sixth lens with positive refractive power, and a seventh lens with positive refractive power. Therefore, the projection prime lens of the present invention has a small size and a good image quality.

20 Claims, 3 Drawing Sheets

PRIME LENS FOR A PROJECTOR

CROSS-REFERENCES TO RELATED APPLICATIONS

This non-provisional application claims priority under 35 U.S.C. §119(a) to Patent Application No. 099146945 filed in Taiwan, R.O.C. on Dec. 30, 2010, the entire contents of which are hereby incorporated by reference.

BACKGROUND OF THE INVENTION

The present invention relates generally to a lens, and more particularly to a projection prime lens for a projector, or simply a prime lens. Throughout the specification and claims the terms and phrases "projection prime lens" and "prime lens" will refer to the prime lens for the projector.

DESCRIPTION OF THE RELATED ART

With advancement in video technology today, usage of projectors has become more common in modern life. The projector has a prime lens, which is one of the key elements in the projector to project images with high definition on screen.

Conventional projection prime lenses usually have four or more lens groups. There are spaces between the lens groups, and each lens group has a plurality of lenses and the lenses are kept a distance from each other. Therefore, the conventional projection prime lenses are huge and heavy. Since there are a lot of lens groups and a lot of lenses in each lens group, a complex process is required to produce the projection prime lenses, meanwhile; the cost for production is also very high, and it requires a longer period of time for the manufacturing process to run its course.

SUMMARY OF THE INVENTION

The primary objective of the present invention is to provide a projection prime lens which has a small size, and a low cost to manufacture, and also, it has a high optical performance.

According to the objective of the present invention, the present invention provides a projection prime lens including first lens group, a second lens group, and a third lens group arranged in sequence along an optical axis from a screen side, to a light modulator side. The first lens group has negative refractive power and includes a first lens with negative refractive power and a second lens with negative refractive power. The second lens group has positive refractive power and includes a third lens with positive refractive power and a fourth lens with positive refractive power The third lens group has positive refractive power and includes a fifth lens with negative refractive power, a sixth lens with positive refractive power, and a seventh lens with positive refractive power.

Therefore, the projection prime lens of the present invention has a small size and good image quality.

DETAILED DESCRIPTION OF THE INVENTION

Figure 1:
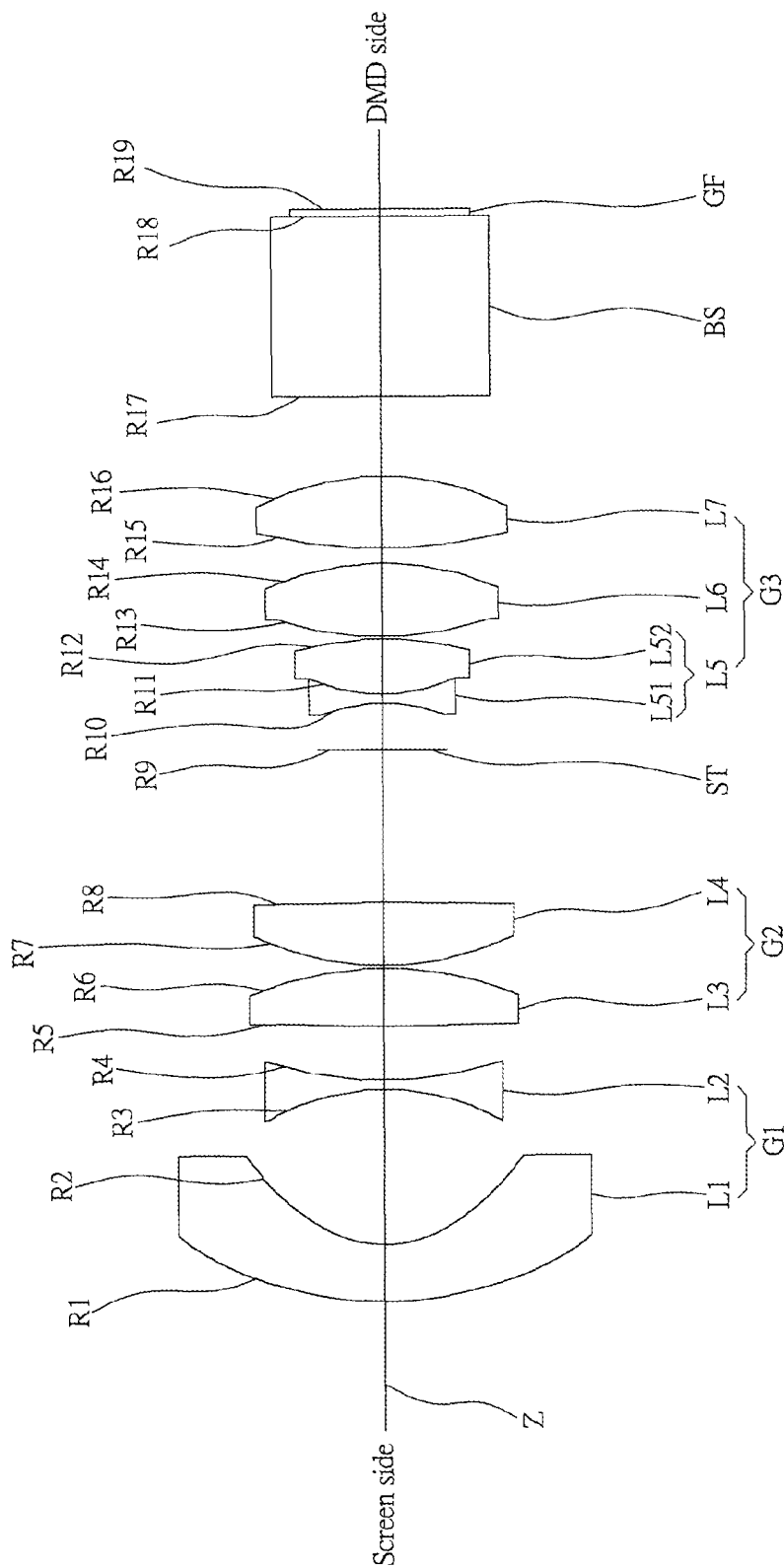
FIG. 1 is a sketch diagram of the arrangement of the lenses of a preferred embodiment of the present invention.

As shown in FIG. 1, a projection prime lens of the preferred embodiment of the present invention includes, along an optical axis Z from a screen side to a light modulator (DMD) side, a first lens group G1, a second lens group G2, an aperture ST, and a third lens group G3. It may be further provided with a beam splitter BS and a color filter CF between the third lens group G3, and the DMD side. It is a conventional art, so we do not describe the details here.

The first lens group G1 has negative refractive power and includes a first lens L1 and a second lens L2. The first lens L1 is a plastic meniscus lens with negative refractive power. The first lens L1 has a convex surface R1 facing the screen side, and a concave surface R2 facing the DMD side. The convex surface R1 and the concave surface R2 are aspheric. The second lens L2 is a glass biconcave lens with negative refractive power. In order to capture a better image, the second lens L2 further has the following condition:

$|nL2/vL2|<0.08$

Wherein:
nL2: refraction index of the second lens L2; and
vL2: dispersion index of the second lens L2.

The second lens group G2 has positive refractive power and includes a third lens L3 and a fourth lens L4. The third lens L3 is a glass biconvex lens with positive refractive power, and the fourth lens L4 is a glass biconvex lens with positive refractive power as well.

The third lens group G3 has positive refractive power and includes a fifth lens L5, a sixth lens L6, and a seventh lens L7. The fifth lens L5 is a doublet with negative refractive power, including a glass biconcave lens L51 and a glass biconvex lens L52. The biconcave lens L51 is closer to the screen side, than to the biconvex lens L52. The sixth lens L6 is a plastic biconvex lens with positive refractive power. The seventh lens L7 is a glass biconvex lens with positive refractive power and has two aspheric convex surfaces R15 and R16.

In order to shorten a length of the lens and correct aberration, the projection prime lens of the present invention has the following conditions:

$|fa/f|<1;$ (1)

$1.5<|fb/f|<|fc/f|<2;$ (2)

$tt/f<10;$ (3)

In addition, in order to increase the back focus length, the projection prime lens of the present invention further has the following conditions:

$|f7/f|<1;$ (4)

$|f/bf|<0.43;$ (5)

$tt/bf<4.1;$ (6)

Furthermore, in order to increase the back focus length and shorten a length of the lens, the projection prime lens of the present invention further has the following conditions:

$ex/bf<-6;$ (7)

$lt/tt<0.76;$ (8)

Wherein:
f: effective focus length of the projection prime lens;
fa: effective focus length of the first lens group G1;
fb: effective focus length of the second lens group G2;
fc: effective focus length of the third lens group G3;
tt: total length of the projection prime lens;
f7: effective focus length of the seventh lens group G7;
bf: back focus length of the projection prime lens;
ex: exit pupil position of the projection prime lens;

lt: total length of the lens groups (from the surface R1 of the first lens L1 to the surface R19 of the last lens R19)

Table 1 shows focus length (F), F-number (Fno), radius of curvature of the lens at the optical axis (R), thickness of the lens at the optical axis (T), refractive index (Nd), and the Abbe number (Vd):

TABLE 1

F = 10 mm Fno = 1.6

| Surface | R(mm) | T(mm) | Nd | Vd | Note |
|---|---|---|---|---|---|
| R1 | 30.328 | 5.06 | 1.52467 | 56.4 | L1 |
| R2 | 10.438 | 13.78 | | | |
| R3 | −21.597 | 0.8 | 1.805181 | 25.43 | L2 |
| R4 | 35.607 | 4.76 | | | |
| R5 | 319.3 | 5.16 | 1.84666 | 23.778 | L3 |
| R6 | −32.11 | 0.23 | | | |
| R7 | 27.363 | 5.65 | 1.834 | 37.16 | L4 |
| R8 | −331.6 | 13.53 | | | |
| R9 | ∞ | 4.13 | | | ST |
| R10 | −16.10 | 0.8 | 1.740769 | 27.79 | L5 |
| R11 | 16.1 | 4.95 | 1.497 | 81.546 | |
| R12 | −29.135 | 0.15 | | | |
| R13 | 30.7 | 6.57 | 1.497 | 81.546 | L6 |
| R14 | −25.711 | 1.29 | | | |
| R15 | 31.0172 | 6.44 | 1.52467 | 56.4 | L7 |
| R16 | −24.514 | 7.05 | | | |
| R17 | ∞ | 16 | 1.5168 | 64.167 | BS |
| R18 | ∞ | 0.65 | 1.487490 | 70.24 | CF |
| R19 | ∞ | | | | |

The depths of aspheric concave surfaces R1, R2, R15, and R16 may be obtained by the following equation:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

Wherein:
z: depth of aspheric concave surface;
c: reciprocal of radius of curvature;
h: radius of aperture of surface;
k: conic constant; and
A~G: coefficient of the radius of aperture of surface.

Table 2 shows the conic constants of the aspheric surfaces and the coefficients A~G of the radius of aperture of surface h:

TABLE 2

| Surface | R1 | R2 | R15 | R16 |
|---|---|---|---|---|
| K | 1.142006 | −1.244285 | −0.483783 | −0.608417 |
| A | −2.385192e−005 | 3.776926e−005 | −3.036066e−005 | 1.335492e−005 |
| B | 2.655366e−008 | −2.02161e−007 | −6.483263e−008 | −1.337726e−007 |
| C | 6.725773e−011 | 2.782738e−009 | −2.013698e−010 | 2.176305e−010 |
| D | −4.189835e−013 | −1.248496e−011 | 6.463818e−014 | −7.996752e−013 |
| E | 3.573853e−016 | 4.419806e−015 | −1.72231e−014 | −8.504971e−015 |
| F | 1.180247e−018 | 2.051803e−016 | 1.834408e−017 | −1.197183e−017 |
| G | −2.335696e−021 | −5.057128e−019 | 2.763929e−019 | 2.881075e−019 |

With the arrangement of the lenses and aperture ST as described above, the projection prime lens of the present invention may have a small size and a good image quality. FIG. 2A to FIG. 2D show the results of the present invention.

Figure 2:
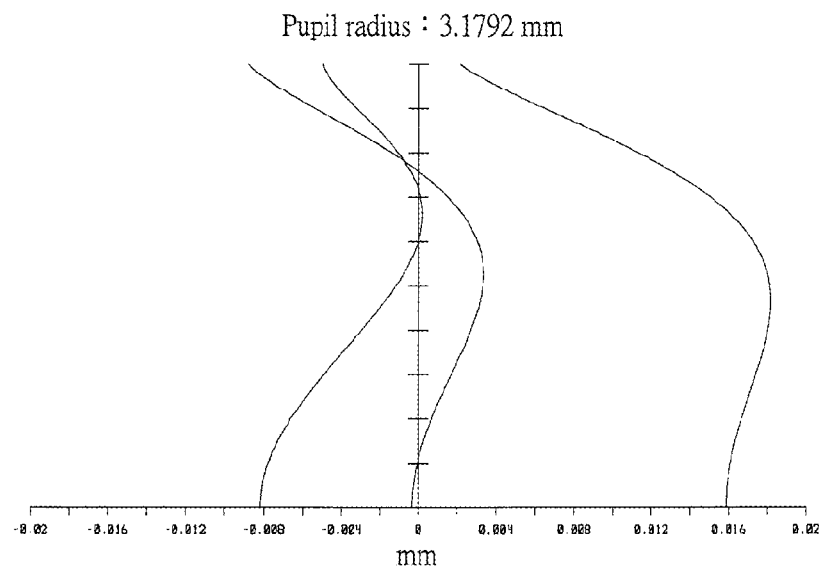
FIG. 2A is a longitudinal aberration diagram of the preferred embodiment of the present invention.
FIG. 2B is a lateral aberration diagram of the preferred embodiment of the present invention.
FIG. 2C is a field curvature diagram and a distortion diagram of the preferred embodiment of the present invention.
FIG. 2D is a Spatial Frequency MTF diagram of the preferred embodiment of the present invention.
Figure 2:
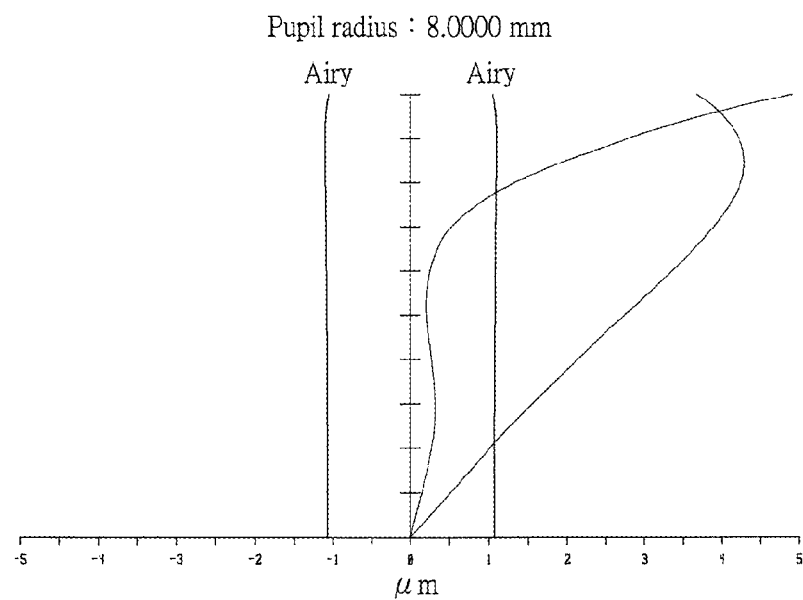
Figure 2:
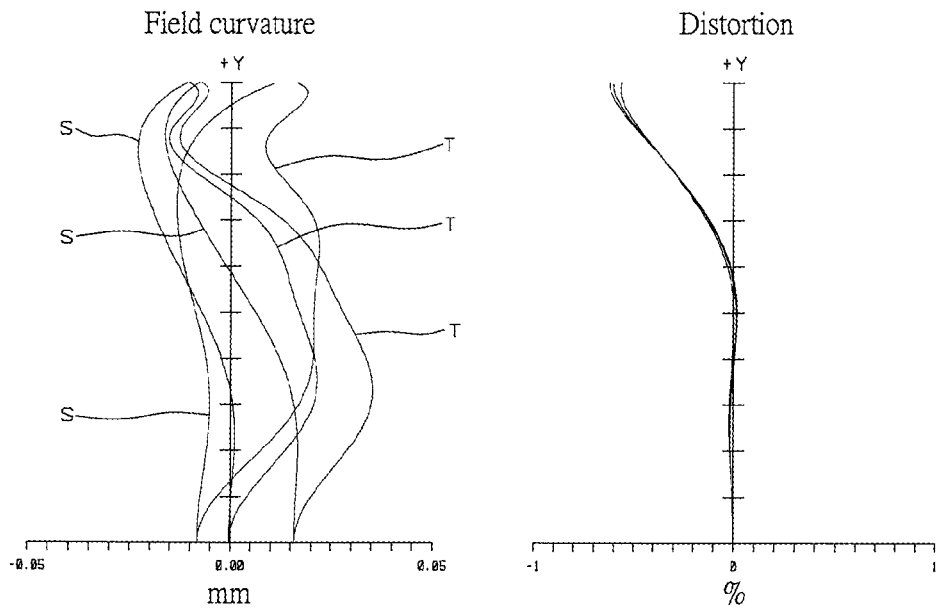
Figure 2:
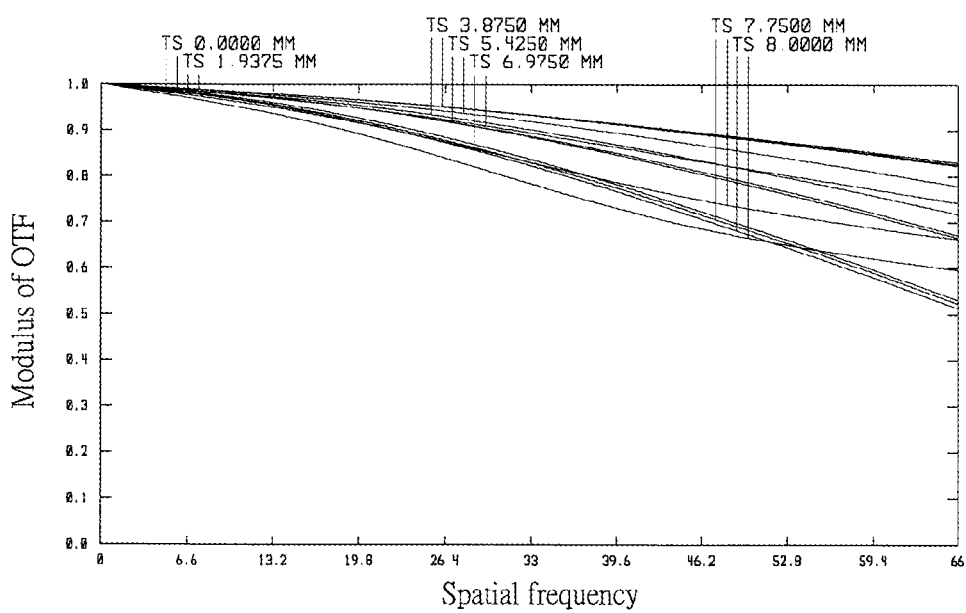

FIG. 2A is a longitudinal aberration diagram of the preferred embodiment of the present invention; FIG. 2B is a lateral aberration diagram of the preferred embodiment of the present invention; FIG. 2C is a field curvature diagram and a distortion diagram of the preferred embodiment of the present invention; and FIG. 2D is a Spatial Frequency MTF diagram of the preferred embodiment of the present invention.

In FIG. 2A and FIG. 2B, the range of longitudinal aberration is between 0.010 mm and −0.02 mm, and the range of lateral aberration is between 5 μm and −1 μm. In FIG. 2C, the maximum field curvature of the present invention is between 0.05 mm and −0.03 mm, and the distortion is under 1%. In FIG. 2D, the value of optical-modulation transfer function is still greater than 50% when the lens is at 66 lp/mm. The results show that the resolution of the projection prime lens of the present invention is qualified, compared to standard resolution.

In conclusion, the projection prime lens of the present invention has a small size and a good image quality. It may reduce the cost and time spent at a manufacturer.

The description above is a few preferred embodiments of the present invention and the equivalence of the present invention is still in the scope of claim construction of the present invention.

What is claimed is:

1. A prime lens for a projector comprising:
   a first lens group, a second lens group, and a third lens group arranged in sequence along an optical axis from a screen side to a light modulator side;
   the first lens group having negative refractive power and including a first lens with negative refractive power and a second lens with negative refractive power;
   the second lens group having positive refractive power and including a third lens with positive refractive power and a fourth lens with positive refractive power;
   the third lens group having positive refractive power and including a fifth lens with negative refractive power, a sixth lens with positive refractive power, and a seventh lens with positive refractive power;
   wherein the seventh lens has at least one aspheric surface.

2. The prime lens as defined in claim 1, further comprising an aperture between the second lens group and the third lens group.

3. The prime lens as defined in claim 1, wherein the first lens is made of plastic and has at least one aspheric surface.

4. The prime lens as defined in claim 1, wherein the second lens has a limitation of |nL2/vL2|<0.08, wherein nL2 is a refraction index of the second lens; and vL2 is a dispersion index of the second lens.

5. The prime lens as defined in claim 1, wherein the fifth lens is a doublet having a biconcave lens and a biconvex lens, and the biconcave lens is closer to the screen side, than to the biconvex lens.

6. The prime lens as defined in claim 1, wherein |fa/f|<1; wherein the fa is an effective focus length of the first lens group, and the f is an effective focus length of the prime lens.

7. The prime lens as defined in claim 1, wherein $1.5<|fb/f|<|fc/f|<2$, wherein the fb is an effective focus length of the second lens group, the fc is an effective focus length of the third lens group, and the f is an effective focus length of the prime lens.

8. The prime lens as defined in claim 1, wherein $1.5<|fb/f|<|fc/f|<2$, wherein the fb is an effective focus length of the second lens group, the fc is an effective focus length of the third lens group, and the f is an effective focus length of the prime lens.

9. The prime lens as defined in claim 1, wherein $|f7/f|<1$, wherein the f7 is an effective focus length of the seventh lens group, and the f is an effective focus length of the prime lens.

10. The prime lens as defined in claim 1, wherein $|f7/f|<1$, wherein the f7 is an effective focus length of the seventh lens group, and the f is an effective focus length of the prime lens.

11. The prime lens as defined in claim 10, wherein $|f/bf|<0.43$, wherein the f is an effective focus length of the prime lens, and the bf is a back focus length of the prime lens.

12. The prime lens as defined in claim 10, wherein $|f/bf|<0.43$, wherein the f is an effective focus length of the prime lens, and the bf is a back focus length of the prime lens.

13. The prime lens as defined in claim 1, wherein $|tt/f|<10$, wherein the tt is a total length of the prime lens, and the f is an effective focus length of the prime lens.

14. The prime lens as defined in claim 13, wherein tt/bf<4.1, wherein the tt is a total length of the prime lens, and the bf is a back focus length of the prime lens.

15. The prime lens as defined in claim 13, wherein ex/bf<−6, wherein the ex is an exit pupil position of the prime lens, and the bf is a back focus length of the prime lens.

16. The prime lens as defined in claim 13, wherein lt/tt<0.76, wherein the lt is a total length of the lens groups, and the tt is a total length of the prime lens.

17. A prime lens for a projector consisting of:
a first lens group, a second lens group, and a third lens group arranged in sequence along an optical axis from a screen side to a light modulator side;
the first lens group having negative refractive power and including a first lens with negative refractive power and a second lens with negative refractive power;
the second lens group having positive refractive power and including a third lens with positive refractive power and a fourth lens with positive refractive power;
the third lens group having positive refractive power and including a fifth lens with negative refractive power, a sixth lens with positive refractive power, and a seventh lens with positive refractive power;
wherein the second lens of the first lens group is a biconcave lens.

18. The prime lens as defined in claim 17, wherein ex/bf<−6, wherein the ex is an exit pupil position of the prime lens, and the bf is a back focus length of the prime lens.

19. The prime lens as defined in claim 17, wherein the seventh lens i has at least one aspheric surface.

20. The prime lens as defined in claim 19, wherein $|fa/f|<1$; wherein the fa is an effective focus length of the first lens group, and the f is an effective focus length of the prime lens.

* * * * *